2,760,962

HEXAHYDROPYRIMIDINE-4,6-DIONE DERIVATIVES

Charles Henry Vasey, Blackley, Manchester, England, assignor to Imperial Chemical Industries Limited, a corporation of Great Britain No Drawing. Application April 30, 1953, Serial No. 352,289

Claims priority, application Great Britain May 9, 1952

4 Claims. (Cl. 260—260)

This invention relates to new pyrimidine derivatives and more particularly it relates to new hexahydropyrimidine-4,6-dione derivatives which possess anti-convulsant properties.

According to the invention we provide new hexahydropyrimidine-4,6-dione derivatives of the formula:

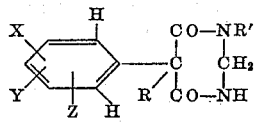

wherein X and Y stand for hydrogen or halogen and Z stands for halogen, wherein R stands for an alkyl radical or an alkenyl radical or not more than 3 carbon atoms and wherein R' stands for hydrogen or for an alkyl radical of not more than 4 carbon atoms.

According to a further feature of the invention we provide a process for the manufacture of the said new hexahydropyrimidine-4,6-dione derivatives which comprises interaction of a malondiamide derivative of the formula

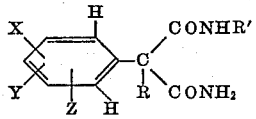

wherein X, Y, Z, R and R' have the meaning stated above, with a substance of the formula

HCOA wherein A stands for NH₂ or OH, or with a substance or mixture of substances capable of giving rise to the substance HCOA in the reaction mixture.

The reaction may be brought about conveniently by heating the reactants together if desired in solution in a solvent or diluent. Such solvent or diluent may be for example cyclohexanol, methylcyclohexanol, N-methylformamide, N - ethylformamide, dimethylformamide, formanilide, N-methylformanilide, N-phenylformanilide, nitrobenzene, dichlorobenzene, and monochloronaphthalenes.

In place of the malondiamide derivative there may be used a substance which will give rise to the malondiamide derivative in the reaction mixture. Such substances include for example N-methylol and N-formyl derivatives of the malondiamide derivative.

The malondiamide derivatives which are used as starting materials may be obtained by hydrolysis of the cyanoacetamide which itself may be obtained by the action of ammonia on the corresponding cyanoacetic ester.

According to yet a further feature of the invention we provide a process for the manufacture of the said new hexahydropyrimidine-4,6-dione derivatives which comprises reduction of compounds of the formula

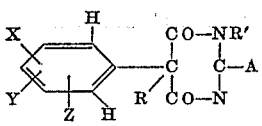

wherein X, Y, Z, R and R' have the meaning stated above and wherein A stands for hydrogen or for the group —BQ wherein B stands for oxygen or sulphur and Q stands for hydrogen or for an alkyl radical.

Thus the starting materials may be thiobarbituric acid derivatives or their S-alkyl derivatives, barbituric acid derivatives or their O-alkyl derivatives, or they may be the tetrahydropyrimidine-4,6-dione derivatives of co-pending application No. 11,757/52 of even date herewith. In the latter case there may be used in place of the tetrahydropyrimidine-4,6-dione derivative also its alcoholate, that is to say the corresponding 2-alkoxyhexahydropyrimidine-4,6-dione.

The process of reduction should be so chosen as to avoid the undesirable elemination of the said halogen substituents.

In the case of the barbituric acid derivatives reduction may be brought about conveniently electrolytically and in the case of their O-alkyl derivatives and of the thiobarbituric acid derivatives and their S-alkyl derivatives, reduction may conveniently also be brought about in neutral medium by means of hydrogen, for example by means of hydrogen in presence of a hydrogenation catalyst for example Raney nickel or palladised strontium carbonate, or by means of a hydrogen containing nickel catalyst for example that known as W5 Raney nickel.

In the case of the tetrahydropyrimidine-4,6-dione derivatives and their alcoholates the reduction may conveniently be brought about in acidic medium, for example by means of zinc and acetic acid or by means of boiling formic acid or formamide, either alone or in presence of dimethylformamide.

According to still a further feature of the invention we provide a process for the manufacture of those of the new hexahydropyrimidine-4,6-dione derivatives of the invention wherein Z is halogen and is in a position meta to the point of attachment to the hexahydropyrimidine ring which comprises mono-nitration of a compound of the formula:

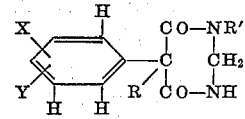

wherein X, Y, R and R' have the meaning stated above and replacement of the nitro group so-introduced by known means by a halogen atom.

The invention is illustrated but not limited by the following examples in which the parts are by weight:

Example 1

60 parts of α-(p-chlorophenyl)-α-ethylmalondiamide, M. P. 137–138° C., are dissolved in 250 parts of formamide and the solution is heated under an air condenser for 2 hours, allowing water vapour and gases to escape. The mixture is then cooled and filtered off. The solid is crystallised from 80% aqueous ethanol and 5-(p-chlorophenyl)-5-ethylhexahydropyrimidine-4,6-dione is obtained as colourless crystals, M. P. 303° C.

In a similar manner, by substituting for the α-(p-chlorophenyl)-α-ethylmalondiamide an equivalent amount of appropriately substituted malondiamides, the following are made: 5(p-fluorophenyl)-5-ethyl-hexahydropyrimidine-4,6-dione, M. P. 271° C., 5-(m-chlorophenyl)-5 - ethylhexahydropyrimidine - 4,6 - dione, M. P. 281° C., 5-(p-bromophenyl)-5-ethylhexahydropyrimidine-4,6-dione, M. P. 309° C., 5-(m-bromophenyl)-5-ethylhexahydropyrimidine-4,6-dione, M. P. 273° C., 5-(p-chlorophenyl) - 5 - methylhexahydropyrimidine - 4,6-dione, M. P. 310° C., 5-(p-chlorophenyl)-5-allylhexahydropyrimidine-4,6-dione, M. P. 300° C., 5-(p-chlorophenyl)-1-methyl-5-ethylhexahydropyrimidine-4,6-dione, M. P. 159° C., 5-(3',4'-dichlorophenyl)-5-ethylhexahydropyrimidine-4,6-dione, M. P. 281° C., and 5-(3',5'-dichlorophenyl)-5-ethylhexahydropyrimidine-4,6-dione, M. P. 272° C.

The malondiamide derivatives used as starting materials in the above process may be obtained by acid hydrolysis of the appropriately substituted cyanoacetamide, or from the appropriately substituted malonyl chloride and ammonia.

*Example 2*

4 parts of α-p-chlorophenyl-α-ethylmalondiamide, 10 parts of dimethylformamide and 1 part of 98% aqueous formic acid are heated together under an air condenser which permits water-vapour and other volatile material to escape. A further 4 parts of 98% aqueous formic acid are added to the mixture during 2 hours. Heating is continued for 30 minutes and the mixture is cooled, extracted with ethanol and filtered. The solid residue consists of 5-(p-chlorophenyl)-5-ethylhexahydropyrimidine-4,6-dione.

*Example 3*

2 parts of 2-methoxy-5-(p-chlorophenyl)-5-ethylhexahydropyrimidine-4,6-dione are heated with 50 parts of formamide under a short air condenser for 1 hour. The mixture is then cooled, 50 parts of water are added and the mixture is then filtered. The solid which separates is filtered off, and crystallised from ethanol. 5-(p-chlorophenyl)-5-ethylhexahydropyrimidine-4,6-dione, M. P. 303° C., is obtained.

*Example 4*

1 part of 2-methoxy-5-(p-chlorophenyl)-5-ethylhexahydropyrimidine-4,6-dione is suspended in 125 parts of methanol. 5 parts of zinc dust and 20 parts of 2 N hydrochloric acid are added. The mixture is stirred at 50° C. for 10 minutes and is then filtered. The filtrate is made alkaline with 32% aqueous sodium hydroxide solution, heated to 50–55° C. for 3 minutes, then cooled and diluted with water and filtered. The solid residue consists of 5-(p-chlorophenyl)-5-ethylhexahydropyrimidine-4,6-dione as colourless plates, M. P. 301–302° C.

*Example 5*

A solution of 10 parts of 5-phenyl-5-ethylhexahydropyrimidine-4,6-dione in 74 parts of 98% sulphuric acid is stirred at 0° C. and a mixture of 3.3 parts of nitric acid (d. 1.5) and 18.4 parts of 98% sulphuric acid is added slowly. The mixture is then stirred for one hour and is then poured on to ice and filtered. The solid residue is crystallised from 80% aqueous ethanol and there is obtained 5-(m-nitrophenyl)-5-ethylhexahydropyrimidine-4,6-dione, M. P. 248–249° C.

A solution of 10 parts of this compound in 200 parts of glacial acetic acid is stirred with 0.1 part of platinum oxide (Adam's catalyst) in an atmosphere of hydrogen at atmospheric pressure. When hydrogen ceases to be absorbed the solution is filtered and the acetic acid is removed from the filtrate by distillation under diminished pressure. The residue is dissolved in dilute hydrochloric acid and filtered and the filtrate is made alkaline with sodium hydroxide solution. It is then filtered and the solid is crystallised from aqueous ethanol to give 5-(m-aminophenyl)-5-ethylhexahydropyrimidine-4,6-dione, M. P. 299–300° C. (decomp.).

23 parts of this compound are dissolved in an excess of dilute hydrochloric acid and the solution is cooled below 5° C. A solution of 7 parts of sodium nitrite in 10 parts of water is added until free nitrous acid remains in the mixture for longer than 5 minutes. The solution is then added to a solution of 100 parts of cuprous chloride in 400 parts of hydrochloric acid. The mixture is then heated to 50° C., cooled and filtered. The solid residue is washed successively with water, ammonium chloride solution, water and methanol. It is then crystallised from ethanol and there is obtained 5-(m-chlorophenyl)-5-ethylhexahydropyrimidine-4,6-dione, M. P. 281° C.

What I claim is:

1. New hexahydropyrimidine-4,6-dione derivatives of the formula:

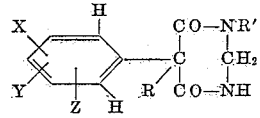

wherein X and Y stand for a member of the group consisting of hydrogen and halogen and Z stands for halogen, wherein R stands for a radical selected from the group consisting of alkyl radicals and alkenyl radicals of not more than 3 carbon atoms and wherein R' stands for a member of the group consisting of hydrogen and alkyl radicals of not more than 4 carbon atoms.

2. New hexahydropyrimidine-4,6-dione derivatives of the formula:

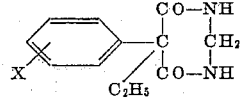

wherein X stands for chlorine in the meta position.

3. Process for the manufacture of the new hexahydropyrimidine-4,6-dione derivatives of the formula:

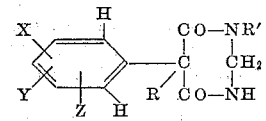

wherein X and Y stand for a member of the group consisting of hydrogen and halogen and wherein Z is halogen and is in a position meta to the point of attachment to the hexahydropyrimidine ring, wherein R stands for a radical selected from the group consisting of alkyl radicals and alkenyl radicals of not more than 3 carbon atoms and wherein R' stands for a member of the group consisting of hydrogen and alkyl radicals of not more than 4 carbon atoms, which comprises mononitrating of a compound of the formula:

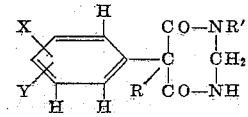

wherein X, Y, R and R' have the meaning stated above by reacting same with nitric acid, converting the nitro group thus introduced into said compound to an amino group by catalytic hydrogenation, diazotizing with sodium nitrite and hydrochloric acid and thereafter reacting with cuprous chloride.

4. New hexahydropyrimidine-4,6-dione derivatives of the formula:

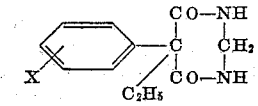

wherein X stands for bromine in the meta position.

References Cited in the file of this patent

UNITED STATES PATENTS 2,576,279   Boon et al. _____ Nov. 27, 1951